United States Patent [19]

Sankrithi

[11] Patent Number: 4,581,897
[45] Date of Patent: Apr. 15, 1986

[54] SOLAR POWER COLLECTION APPARATUS

[76] Inventor: Mithra M. K. V. Sankrithi, 417 Bellevue Way SE. #400, Bellevue, Wash. 98004

[21] Appl. No.: 428,309

[22] Filed: Sep. 29, 1982

[51] Int. Cl.[4] .............................................. F03G 7/02
[52] U.S. Cl. .............................. 60/641.12; 60/641.11; 60/641.15; 126/451
[58] Field of Search ............ 60/641.8, 641.11, 641.12, 60/641.15; 126/417, 451, 424, 442

[56] References Cited

U.S. PATENT DOCUMENTS

| | | | |
|---|---|---|---|
| 4,002,158 | 1/1977 | Radebold | 60/641.15 |
| 4,094,299 | 6/1978 | Voelker | 126/442 |
| 4,361,295 | 11/1982 | Wenzel | 126/424 X |
| 4,391,099 | 7/1983 | Sorensen | 60/641.12 X |

Primary Examiner—Allen M. Ostrager
Assistant Examiner—Stephen F. Husar

[57] ABSTRACT

This invention provides a solar power collection apparatus, with a plurality of Earth surface supported reflectors (heliostats) which reflect sunlight onto a solar receiver which is upheld in an elevated position by one or more tethered aerostats. Variants of the invention may be sited over land or water surfaces. The solar receiver will typically convert light energy into heat energy, which may be used directly or converted into electricity (e.g. by a steam, Brayton cycle, or Rankine cycle turbine power plant). The aerostat(s) which support the solar receiver may obtain lift from helium, hydrogen, or hot air (heated using heat from the receiver/power plant). Automatic control means may be provided for the reflectors to track motions of the aerostat supported solar receiver.

35 Claims, 7 Drawing Figures

SOLAR POWER COLLECTION APPARATUS

SUMMARY OF THE INVENTION

This invention relates to devices which collect power from the Sun's light. Such devices may make important contributions towards the long term solution of the 'energy crisis' problem. This invention more particularly relates to devices which include a plurality of Earth surface supported reflectors (e.g. heliostatic mirrors) which reflect the Sun's light onto a central receiver located at an elevated position with respect to the Earth surface.

Typical example of a device of this class disclosed in the prior art in U.S. Pat. No. 4,164,123 issued to Otto J. M. Smith, and entitled 'Solar Thermal Electric Power Plant'. A feature found in this and other similar devices in the prior art, is the mounting of a central solar receiver on top of a tower.

Several advantages inhere in locating a solar receiver at an elevated position with respect to the Earth surface. Firstly, the elevated positioning of a solar receiver is a geometrical imperative if said solar receiver is to receive sunlight from a field of substantially Earth level reflectors. Secondly, a receiver located at a more elevated position can receive light reflected from a field of reflectors occupying a larger area of the Earth surface than can a receiver at a less elevated position. In this way the total power received is increased, and the thermodynamic efficiency of any heat powered electricity generating device connected to the receiver can also be increased because of the higher operating temperatures possible in this case. Thirdly, even with a fixed Earth surface are on which the reflectors are distributed, a receiver at a more elevated position can generally receive more power, assuming an 'optimal' field of reflectors. Alternatively, a smaller net reflector area can be used if the same power is to be received.

In view of the foregoing arguments, the very high expense involved in building the tall towers desired to support solar receivers is a serious disadvantages of prior art devices. This invention provides an alternative, and under appropriate circumstances more economical, means for supporting solar receivers in elevated positions. Said means comprise the use of one or more tethered aerostats to support said solar receivers in said elevated positions. Increasing the heights at which the aerostats are tethered (and at which the solar receivers are positioned) can be accomplished very economically.

Another advantage of the present invention over the prior art is that it can be sited on almost any portion of the Earth surface—land, water, sand, and swamp-/marshland being examples. It would be relatively easy to tether an aerostat above a barge or other vessel floating on a free water surface (such as the surface of an ocean, sea, lake, or river), where by contrast it would be unfeasible or at least prohibitively expensive to build a tower of comparable height in the same location.

A further advantage of the present invention is that the tethered aerostat and the solar receiver it supports can be moved with relative ease. It may be advantageous for example to move the solar receiver to different 'optimal positions' for different times of day, or different times of year.

Still further advantages and objects of this invention will become apparent from a complete consideration of this specification and the accompanying drawings.

DETAILED DESCRIPTION

It is appropriate to start the detailed description by defining the meanings certain words and expressions are to be understood to convey, in the descriptive portion of this specification and in the appended claims.

The word 'balloon' is to be understood to refer to an aerostatically supported device. A balloon may be of a nonrigid, semirigid, or rigid type. A balloon may be of any of a variety of shapes, including approximately spherical and approximately ellipsoidal shapes.

The expression 'Earth surface' is to be understood to include both the land and water surfaces covering the Earth's surface area.

Any device is defined to be 'supported by the Earth surface' if it is directly or indirectly supported against gravity by land or water, but not by air.

The expression 'Earth surface level' is to be construed to include not only that precise level corresponding to the Earth surface in the immediate vicinity, but any level within the whole range of levels corresponding to those occupied by Earth surface supported structures and below the 'elevated positions' occupied by aerostats (and their payloads).

The word 'light' is to be construed to include electromagnetic radiation of any and all frequencies.

Figure 1:
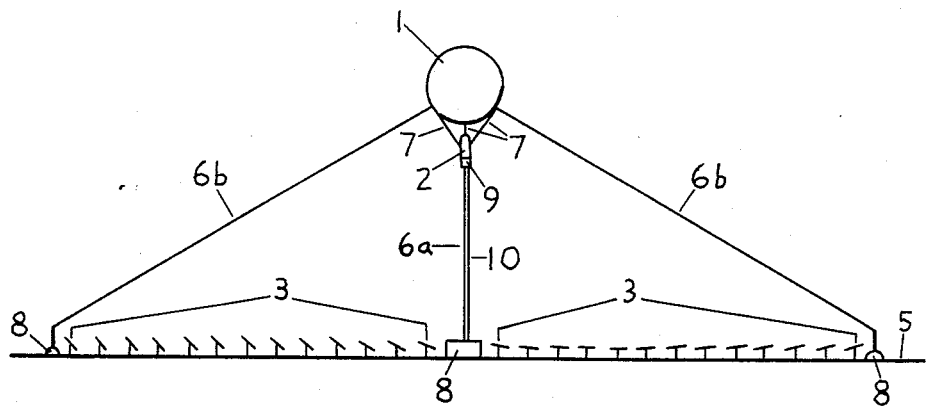
FIG. 1 shows an embodiment of the invention above a land surface.

Having defined some terms, it is next appropriate to consider in detail the illustrated embodiments of the invention and components of the invention. FIG. 1 shows the basic concept of a solar power collection apparatus, with an illustration of an embodiment of the invention sited above a land surface. Here the solar power collection apparatus comprises a tethered balloon 1, a solar receiver 2 upheld in an elevated position (above the Earth surface) by the balloon 1, and a plurality of reflectors 3 which reflect light from the Sun 4 onto the solar receiver 2. The reflectors are supported by the Earth surface, which is the land surface 5 in the illustrated embodiment. The reflectors illustrated are substantially planar heliostatic mirrors, which may be automatically controlled to track not only the Sun's effective motion but also to track any possible motions of the solar receiver (intentional and/or due to wind gusts etc.).

The balloon 1 will typically obtain aerostatic lift from helium or hydrogen gas. For unmanned embodiments of the invention hydrogen gas may be acceptable despite its inflammability. One or more tethers 6 will prevent the balloon from rising above its desired position (the balloon is assumed to have a net upward aerostatic lift greater than the total weight of the balloon and its 'payload'). Illustrated are a primary tethering cable 6a and guy wires 6b. Here the guy wires 6b will also help to prevent/reduce lateral motions of the balloon due to horizontal winds/gusts. More guy wires than the two illustrated may of course be provided. The solar receiver may be upheld by the balloon by a variety of means—in the illustrated embodiment the solar receiver is shown cable suspended beneath the balloon by suspending cables 7. Such a cable suspension may incorporate means for winching the solar receiver and other 'payload' devices down to the Earth surface—as may be useful during the night or for service and maintenance. A cable suspension system may incorporate an automatic control system which helps to keep the solar receiver substantially in an inertially stationary position (vertically and laterally) even if the balloon is moved around by winds/gusts. The tether anchoring devices 8, which anchor the tethers to the land surface, may be moveable on the land surface. By moving the tether anchoring devices (perhaps along tracks), and/or by winching various tethers in/out, the balloon may be be moved. It may be desirable to move the balloon (and thus the solar receiver) to different 'optimal' locations as a function of time of day, and time of year. It may be possible for embodiments of the invention with a movable balloon to feature single-axis mountings for the heliostats. Active control may be used for the tethers to apply forces on the balloon which counter wind/gust forces on the balloon.

In the preferred mode of carrying out the invention the solar receiver 2 will be a solar thermal receiver. That is, light energy from the Sun's light, as reflected onto the solar thermal receiver by the reflectors, will be converted by the solar thermal receiver into heat energy. This heat energy may be used directly to heat a solar heater (e.g. furnace or oven). However, in the more preferred mode of carrying out the invention this heat energy will subsequently be converted to electrical energy (a form of 'work energy' as opposed to 'heat energy') through the use of a heat powered electricity generating device. FIG. 1 shows an optical heat powered electricity generating device 9, which is here mounted adjacent to the solar receiver, and is also upheld in an elevated position by the balloon. Examples of heat powered electricity generating devices which can be used include (superheated) steam turbine power plants, Brayton cycle turbine power plants, and Rankine cycle turbine power plants. While rotary turbine+generator power plants are the norm, reciprocating for other mechanism power plants may also be used within the scope of this invention. Brayton cycle turbine power plants are likely to use air or helium as their working fluid. Lifting helium gas from the balloon may also be used as the working fluid in a Brayton cycle turbine power plant. Heated exhaust helium from the power plant can be exhausted into the balloon to provide extra aerostatic lift (as heated helium has a lower density than unheated helium). Rankine cycle turbine power plants are likely to use liquid sodium or molten salts as their working fluids. In the illustrated embodiment, electricity generated by the heat powered electricity generating device 9 is carried down to Earth level by the electric cable 10.

Figure 2:
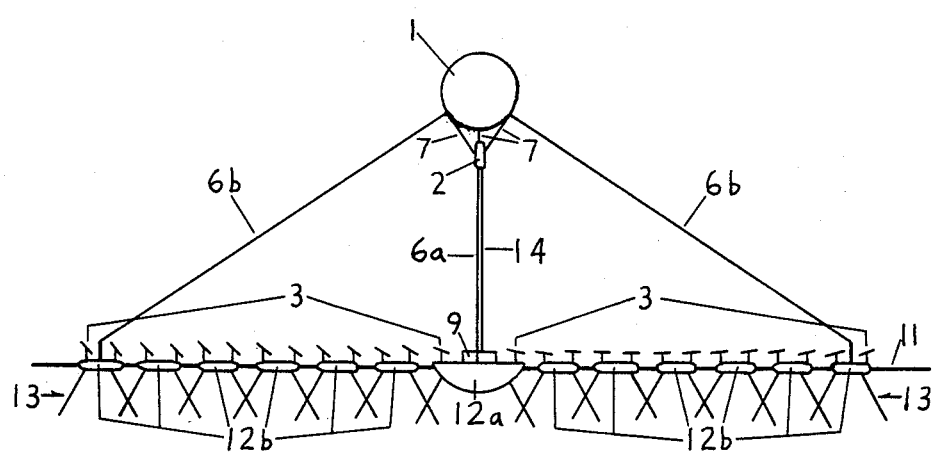
FIG. 2 shows an embodiment of the invention above a water surface.

FIG. 2 shows an embodiment of the solar power collection apparatus sited above a portion of the Earth surface which is a water surface 11. This water surface may for example be the surface of an ocean, sea, lake, river, or swamp. In this embodiment the balloon 1 is tethered to a plurality of floats 12. The illustration shown features a primary float 12a and several auxiliary floats 12b. These floats may for example be barges, buouys, or other floating vessels. The illustrated floats are tethered to the underwater tethers 13. In this embodiment the reflectors are supported by the floats, which in turn are supported by the water, which in turn is supported by the underwater ground surface. The reflectors are to be construed to be supported by the 'Earth surface'. Automatic control means may be provided for aiming the reflectors to reflect sunlight onto the solar receiver 2 even when the floats supporting the reflectors move or rock due to water/wave motions. Means for compensating for solar receiver motions may again be provided. In the more preferred mode in which heat energy is converted into electrical energy, the embodiment of FIG. 2 differs from that of FIG. 1 in that it features the location of the optional heat powered electricity generating device at Earth level, or more particularly on the primary float 12a. Again the heat powered electricity generating device may feature a steam, Brayton cycle, or Rankine cycle turbine power plant. When the powerplant is thus located at Earth level, fluid transport pipes carrying 'cold' working fluid up to the solar receiver and 'hot' working fluid down from the solar receiver must be provided. A bundle of such fluid transport pipes is designated 14 in this embodiment. Note that either elevated or Earth level heat powered electricity generating devices can be used for either water or land sitings of the solar power collection device. Some 'typical scale' values of parameters can be cited for embodiments sited over either land or water. Typical balloon volumes will range from $10^4$ to $10^8$ cu.ft. The 'elevated position' at which the solar receiver is upheld will typically be 100 ft. or more above the Earth surface. The Earth surface area on which reflectors associated with each solar receiver are sited will typically range from $10^4$ to $10^8$ sq.ft. Power production from the heat powered electricity generating device (if any) will typically be on the range of 10 kW to 1000 MW. However, it is to be understood that embodiments with some or all parameter values outside the range of the 'typical scale' values cited above, also fall within the scope of the present invention.

Figure 3:
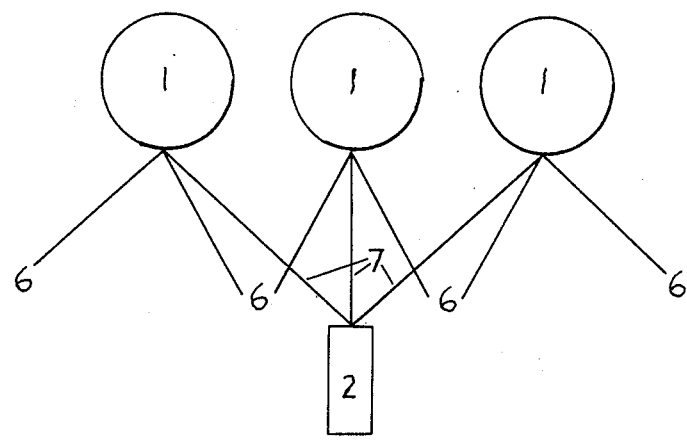
FIG. 3 shows a single solar receiver being upheld by a plurality of tethered balloons.

FIG. 3 shows a single solar receiver 2 upheld by a plurality of balloons 1. Additional balloons not shown here may be used in front of and behind those balloons which are shown. The suspending cables 7 may optionally be extensions of the tethers 6, simply run around pulleys attached to the balloons. It is expected that in the embodiment of FIG. 3 the solar receiver can be effectively moved with respect to the balloons by selectively reeling in or reeling out the suspending cables. An automatic control system which keeps the solar receiver in a substantially stationary position with respect to the Earth surface (even if the balloons move due to winds/gusts) can be effectively implemented here.

While FIG. 3 shows a plurality of balloons supporting a single solar receiver, alternate embodiments of the present invention can equally well feature a single balloon supporting more than one solar receiver. Embodiments are also envisioned which cover large areas of the Earth surface, and have a plurality of balloons and a plurality of solar receivers. In such embodiments a given Earth surface supported reflector may reflect sunlight onto different solar receivers at different times of day.

Figure 4:
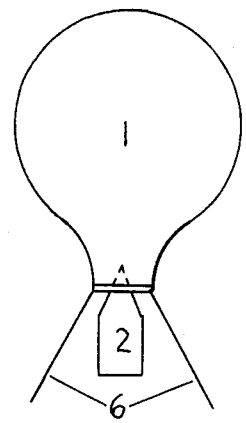
FIG. 4 shows a solar receiver being upheld by a tethered hot air balloon.

FIG. 4 shows a solar receiver 2 upheld by a hot air balloon 1. The solar receiver illustrated is installed in the bottom open throat region of the hot air balloon, but alternate embodiments with the solar receiver installed either fully externally or fully internally are also possible. The hot air in the hot air balloon can be heated partially or wholly by heat from the solar receiver and/or by water heat from a heat powered electricity generating device (here preferably a Brayton cycle turbine power plant using air as its working fluid).

Figure 5:
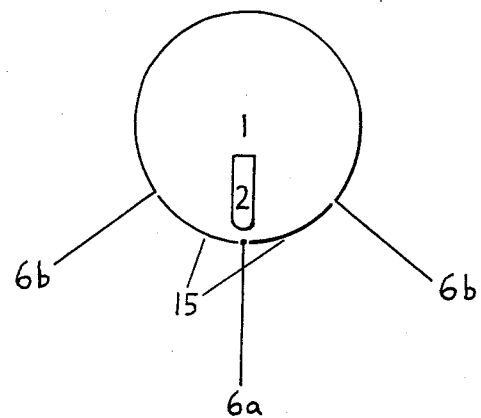
FIG. 5 shows a solar receiver within a tethered balloon with transparent bottom panels.

FIG. 5 shows a solar receiver 2 installed internally in an enclosed balloon 1. The balloon 1 is here fitted with transparent bottom panels 15, through which sunlight reflected from the Earth surface supported reflectors can pass, so as to be able to reach the internal solar receiver 2. Residual heat from the solar receiver and the balloon, increasing the aerostatic lift acting on the balloon.

Figure 6:
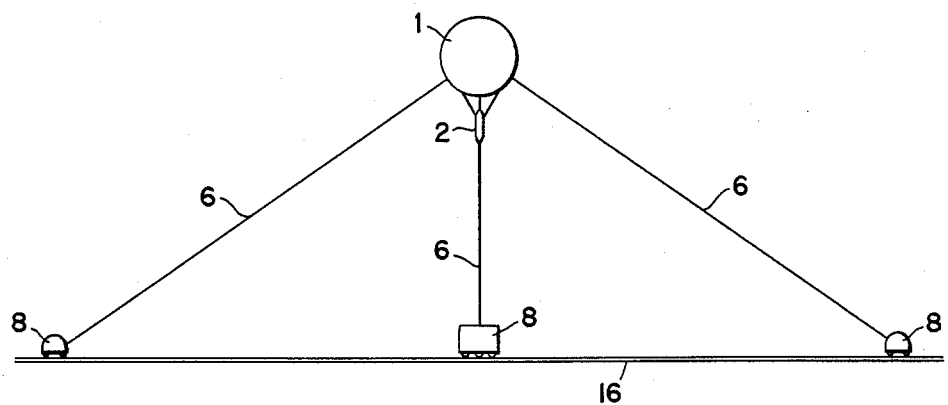
FIG. 6 shows a solar receiver upheld by a tethered balloon, with means for the tethered balloon to be tethered in different positions.

FIG. 6 shows a solar receiver 2 upheld by a tethered balloon 1, with means for the tethered balloon to be moved to different positions. The illustrated means for the balloon to be moved comprise the attachment of the tethers 6 to wheeled tether anchoring devices 8, which are movable along the tracks 16. Note that the field of heliostats is not illustrated in this Figure, as the field of heliostats is not direclty relevant to the purpose of this Figure (i.e. to illustrate means for the tethered balloon to be tethered in different positions).

Figure 7:
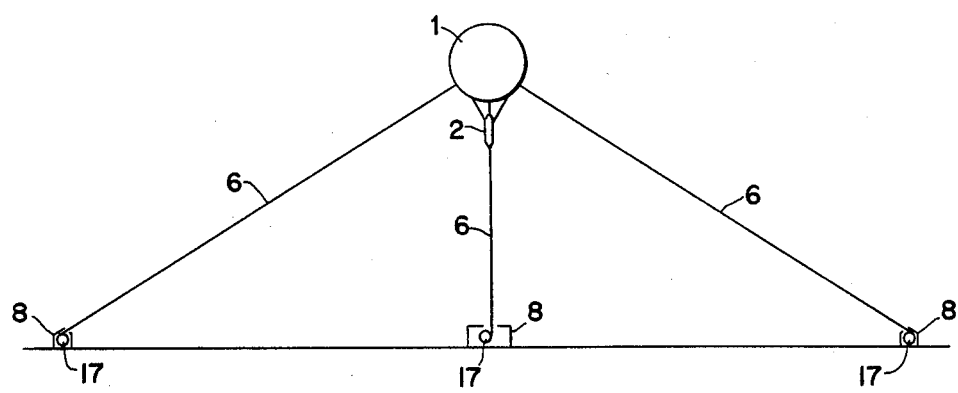
FIG. 7 shows a solar receiver upheld by a tethered balloon, with automatic control means for reducing externally stimulated motions of said solar receiver.

FIG. 7 shows a solar receiver 2 upheld by a tethered balloon 1, with automatic control means for reducing externally stimulated motions of said solar receiver 2, upheld by said tethered balloon 1. The automatic control means comprise means for winching the tethers 6 in/out from each of the tether anchoring devices 8. The rollers around which the tethers can be winched are designated 17 in this Figure. Note again that the field of heliostats is not illustrated in this Figure, as the field of heliostats is not directly relevant to the purpose of this Figure.

While the illustrated embodiments have been described in detail above, it is to be understood that further modifications and variations may be made within the spirit and scope of the invention as defined in the appended claims.

What is claimed is:

1. A solar power collection apparatus, comprising
   a tethered aerostatic device,
   a solar receiver upheld in an elevated position by said tethered aertostatic device,
   a plurality of reflectors supported by the Earth surface, and
   means for aiming said reflectors so that they reflect light from the Sun onto said solar receiver.

2. The solar power collection apparatus of claim 1, wherein said tethered aerostatic device comprises a single tethered balloon.

3. The solar power collection apparatus of claim 1, wherein said tethered aerostatic device includes at least two balloons.

4. The solar power collection apparatus of claim 1, wherein the aerostatic lift of said tethered aerostatic device is primarily provided by helium gas.

5. The solar power collection apparatus of claim 1, wherein the aerostatic lift of said tethered aerostatic device is primarily provided by hydrogen gas.

6. The solar power collection apparatus of claim 1, wherein said tethered aerostatic device is a tethered hot air balloon.

7. The solar power collection apparatus of claim 6, wherein the hot air in said hot air balloon is at least partially heated by residual heat from said solar receiver.

8. The solar power collection apparatus of claim 1, wherein said solar receiver includes means for converting solar light energy into heat energy.

9. The solar power collection apparatus of claim 8, wherein said heat energy is used to heat a solar heater.

10. The solar power collection apparatus of claim 1, wherein said solar receiver is a solar thermal receiver.

11. The solar power collection apparatus of claim 10, further comprising means for conveying heat from said solar thermal receiver to a heat powered electrically generating device.

12. The solar power collection apparatus of claim 11, wherein said heat powered electricity generating device comprises a steam turbine power plant.

13. The solar power collection apparatus of claim 11, wherein said heat powered electricity generating device comprises a Brayton cycle turbine power plant.

14. The solar power collection apparatus of claim 13, wherein the working fluid of said Brayton cycle turbine power plant is primarily air.

15. The solar power collection apparatus of claim 13, wherein the working fluid of said Brayton cycle turbine power plant is primarily gaseous helium.

16. The solar power collection apparatus of claim 4, wherein said solar receiver is connected to a Brayton cycle turbine power plant, and wherein said helium gas providing aerostatic lift is also used as the working fluid of said Brayton cycle turbine power plant.

17. The solar power collection apparatus of claim 11, wherein said heat powered electricity generating device comprises a Rankine cycle turbine power plant.

18. The solar power collection apparatus of claim 17, wherein the working fluid of said Rankine cycle turbine power plant is primarily molten salt.

19. The solar power collection apparatus of claim 17, wherein the working fluid of said Rankine cycle turbine power plant is primarily liquid sodium.

20. The solar power collection apparatus of claim 11, wherein said heat powered electricity generating device is also upheld in an elevated position by said tethered aerostat.

21. The solar power collection apparatus of claim 11, wherein said heat powered electricity generating device is supported by the Earth surface.

22. The solar power collection apparatus of claim 1, further comprising means for conveying power down from said elevated position of said solar receiver to Earth surface level.

23. The solar power collection apparatus of claim 1, wherein said solar receiver is cable suspended from said tethered aerostat.

24. The solar power collection apparatus of claim 23, wherein said solar receiver can be winched down from said elevated position to a position in which it is supported by the Earth surface.

25. The solar power collection apparatus of claim 1, wherein said solar receiver is located within said aerostatic device.

26. The solar power collection apparatus of claim 1, wherein said reflectors are substantially planar heliostatic mirrors.

27. The solar power collection apparatus of claim 1, wherein said tethered aerostatic device is tethered above a land surface.

28. The solar power collection apparatus of claim 1, wherein said tethered aerostatic device is tethered above a water surface.

29. The solar power collection apparatus of claim 28, wherein said tethered aerostatic device is tethered to a float on said water surface.

30. The solar power collection apparatus of claim 28, wherein said reflectors are float supported.

31. The solar power collection apparatus of claim 1, with means for said tethered aerostatic device to be tethered in different positions.

32. The solar power collection apparatus of claim 1, with tethering means which include guy wires inclined from the vertical, for tethering said tethered aerostatic device.

33. The solar power collection apparatus of claim 1, wherein said means include means for compensating for motions of said solar receiver upheld by said tethered aerostat.

34. The solar power collection apparatus of claim 30, wherein said means include means for compensating for motions of the reflector supporting floats.

35. The solar power collection apparatus of claim 1, further comprising automatic control means for reducing externally stimulated motions of said solar receiver with respect to an Earth fixed reference frame.

* * * * *